United States Patent [19]

Terashima

[11] Patent Number: 5,188,202
[45] Date of Patent: Feb. 23, 1993

[54] REACTION FORCE TYPE DISK BRAKE

[75] Inventor: Hideyuki Terashima, Nagano, Japan

[73] Assignee: Nissin Kogyo Kabushiki Kaisha, Nagano, Japan

[21] Appl. No.: 687,655

[22] Filed: Apr. 19, 1991

[30] Foreign Application Priority Data

Apr. 20, 1990 [JP] Japan ................................ 2-42181[U]

[51] Int. Cl.$^5$ .............................................. F16D 65/20
[52] U.S. Cl. ............................... 188/73.45; 188/73.32; 188/73.39
[58] Field of Search ...................... 188/71.1, 71.3, 72.1, 188/72.4, 72.5, 73.1, 73.31, 73.32, 73.39, 73.44, 73.45, 205 R, 206 R, 264 A, 264 AA, 73.47; 403/154, 155, 362

[56] References Cited

U.S. PATENT DOCUMENTS

| 3,017,657 | 1/1962 | Mills | 403/362 X |
| 3,347,110 | 10/1967 | Wilson | 403/362 X |
| 3,384,203 | 5/1968 | Walther | |
| 4,345,675 | 8/1982 | Ritsema | 188/73.47 X |
| 4,609,079 | 9/1986 | Méry | 188/73.45 |
| 4,756,639 | 7/1988 | Hoshino | 403/362 X |
| 4,784,243 | 11/1988 | Méry et al. | 188/73.45 |
| 4,912,809 | 4/1990 | Scheuer | 403/362 X |

FOREIGN PATENT DOCUMENTS 5374583 11/1976 Japan .
62-6997 2/1987 Japan .
180833 5/1989 Japan .
1575513 9/1980 United Kingdom .

Primary Examiner—Robert J. Oberleitner
Assistant Examiner—Peter M. Poon
Attorney, Agent, or Firm—Armstrong, Westerman, Hattori, McLeland & Naughton

[57] ABSTRACT

A reaction force type disk brake includes a brake disk, first and second friction pads opposed to opposite faces of the brake disk, a brake caliper including first and second clamping arms for clamping the pads, a hanger pin bridged over the clamping arms for hanging the pads, an urging member in the first clamping arm for urging the first friction pad against the brake disk, a stationary bracket for supporting the brake caliper through a pair of slide pins arranged on both sides of the urging member circumferentially of the disk for sliding movement along the rotational axis of the disk, a portion on the bracket for supporting the braking torque of the first friction pad, and a portion on the brake caliper for supporting the braking torque of the second friction pad. The brake caliper is formed of a first block having the first clamping arm and a second block having the second clamping arm and secured to the first block. A pair of connecting bolts are disposed in proximity to the urging member on both sides thereof in the circumferential direction of the brake disk for securing the first and second blocks together.

12 Claims, 8 Drawing Sheets

Vehicle front

REACTION FORCE TYPE DISK BRAKE

BACKGROUND OF THE INVENTION

1. Field of the Invention

The field of the invention is reaction force type disk brakes principally used for a vehicle, and more particularly, improvements in disk brakes of the type comprising a brake disk, a first and a second friction pad which are opposed to opposite faces of the brake disk, a brake caliper provided with a first and a second clamping arm for clamping the friction pads, a hanger pin bridged between the clamping arms for hanging both the friction pads, an urging member provided on the first clamping arm to urge the first friction pad against the brake disk, a stationary bracket for supporting the brake caliper through a pair of slide pins arranged on both sides of the urging member in a circumferential direction of the brake disk so as to permit the caliper to slide along a rotational axis of the brake disk, a braking-torque supporting portion provided on the bracket for supporting the braking torque of the first friction pad, and another braking-torque supporting portion provided on the brake caliper for supporting the braking torque of the second friction pad, the brake caliper including a first block having the first clamping arm, and a second block having the second clamping arm and secured to the first block.

The reason for forming brake disk of the two blocks in the mentioned manner is for the purpose of providing a good workability in machining a slide portion for the urging member in the first block.

2. Description of the Prior Art

The present applicant has previously developed a disk brake of this type as described in Japanese Utility Model Application Laid-open No. 80833/89.

In this disk brake, each slide pin is disposed in closer proximity to the urging member than each connecting bolt which connects the first and second blocks.

When the brake caliper is constructed of an assembly type from the first and second blocks as mentioned above, in order to increase the connecting strength between both the blocks so that the two arms are not opened or spreaded during operation of the urging member, it is desirable that the bolts should be disposed in the vicinity of the urging member. On the other hand, in order to support the brake caliper on the bracket with a good stability, it is desirable that the distance between the slide pins should be as wide as possible.

In the above-described disk brake, however, the positional relationship between the connecting bolts and the slide pins is reverse to the above-described demands, and therefore, an improvement in this respect is desired.

Another known example of a disk brake of this type is described in Japanese Utility Model Application Laid-open No. 74583/78.

In this disk brake, the urging center of the urging member located on the first friction pad in the central position in the circumferential direction of the brake disk and the rotational center of the brake disk are set on a first phantom straight line. A pair of fixed points at which the bracket is fixed on the knuckle of the vehicle are set on a second phantom straight line which intersects the first phantom straight line at a location closer to the rotational center of the brake disk than the urging center on face side of the brake disk. In addition, the fixed points lie on the both sides of the first phantom straight line, respectively. A pair of slide pin supporting points of the bracket are at locations closer to the outer periphery of the brake disk than a third phantom straight line which extends parallel to the second phantom straight line and passes the urging center.

However, if the slide pin supporting points are located in the above manner, the distance between the slide pin supporting point and the fixed point becomes longer and hence, when the braking torque of the second friction pad is applied to the slide pin supporting points through the brake caliper and the slide pins, a relative large rotational moment is produced about the fixed points.

This is undesirable for providing an improvement in durability of the bracket.

In the above-described disk brake, slide pin supporting portions of the bracket are disposed within a pair of windows provided in the brake caliper, and the pair of slide pins mounted on the brake caliper are slidably fitted into cylindrical guides of the slide pin supporting portions.

In such a disk brake, however, when the brake caliper supports the braking torque of the second friction pad, the urging forces acting in opposite directions are applied to opposite ends of each of the slide pins around the fitted portion of the slide pin in the cylindrical guide. This causes a torsional force to be applied to the slide pin supporting portion, resulting in a possibility of causing a defective smoothness in the sliding movement of the brake caliper.

Moreover, the slide pin functions as a bolt for connecting the blocks and therefore, the slide pin may be loosened by repeated urging force due to the braking torque to bring about a reduction in strength of the connecting structure for the blocks. There is also another problem of a degraded handling property in that if each pin is removed from the bracket for maintenance and inspection, the brake caliper is disassembled.

Further, in such a disk brake, the portion for supporting the brake torque and the portion for supporting the slide pin are commonly provided in a single block portion which is projectingly mounted on the bracket.

In such a disk brake, the brake torque of the first friction pad is supported on the braking torque supporting portion during braking and for this reason, a somewhat deflection is produced in the braking torque supporting portion. Under such a situation, if the single block is commonly used, the deflection at the braking torque supporting portion is transmitted directly to the slide pin supporting portion, with the result that a twisting is produced between the slide pin and the slide pin supporting portion, leading to a possibility of causing a defective smoothness in sliding movement of the brake caliper.

The present applicant has previously developed a further structure for preventing the slip-out of the hanger pin in the disk brake, as described in Japanese Utility Model Publication No. 6997/87.

This slip-out preventing structure comprises an annular groove provided in an outer peripheral surface at one end of a hanger pin projecting from the outer side of the brake caliper, and a locking groove provided in a slip-out preventing plate and engaged with the annular groove, the slip-out preventing plate being secured to the brake caliper by a screw. In this case, the hanger pin is provided at the other end thereof with a stopper which engages an opening edge of a pin hole in the brake caliper.

With such a slip-out preventing structure, however, the slip-out of the hanger pin can be reliably prevented, but a problem arises that if a gap is produced between the stopper and the opening edge of the pin hole, for example, due to working error or the like, the hanger pin is loosened axially and radially to generate an abnormal noise.

SUMMARY OF THE INVENTION

It is an object of the invention to provide a reaction force type disk brake of the type described above, wherein the positional relationship between the connecting bolts and the slide pins can be determined to meet the above-described demand.

To achieve the above object, according to the present invention, there is provided a reaction force type disk brake comprising a brake disk, a first and a second friction pad which are opposed to opposite faces of the brake disk, a brake caliper including a first and a second clamping arm for clamping the friction pads, a hanger pin mounted to extend between the clamping arms for hanging the friction pads, an urging member provided in the first clamping arm to urge the first friction pad against the brake disk, a stationary bracket for supporting the brake caliper through a pair of slide pins arranged on opposite sides of the urging member in a circumferential direction of the brake disk such that the brake caliper is slidable in a direction of a rotational axis of the brake disk, a braking-torque supporting portion provided on the bracket for supporting a braking torque of the first friction pad, and a braking-torque supporting portion provided on the brake caliper for supporting a braking torque of the second friction pad, the brake caliper being comprised of a first block having the first clamping arm and a second block having the second clamping arm and secured to the first block, wherein the disk brake further includes at least a pair of connecting bolts disposed in proximity to the urging member and arranged on opposite sides of the urging member in a circumferential direction of the brake disk for securing the blocks together.

Disposition of the connecting bolts in the above manner permits the strength of connection between the blocks in the brake caliper to be increased, thereby ensuring that the clamping arms can be prevented from opening or spreading during operation of the urging member. Disposition of the slide pins in the above manner enables the distance between the slide pins to be increased and thus the brake caliper to be supported on the bracket with a good stability. This ensures that the brake caliper can slide smoothly.

It is another object of the present invention to provide a reaction force type disk brake of the type described above, wherein the rotational moment produced about the fixed points can be reduced to improve the durability of the bracket.

To achieve the above object, according to the present invention, there is provided a disk brake of the mentioned type, wherein the urging member has an urging center lying at a central location of the first friction pad in the circumferential direction of the brake disk, and wherein a pair of fixed points of the bracket to a fixing member are located on a second straight line intersecting a first straight line which passes the urging center and a rotational center of the brake disk, the fixed points being at a location nearer to the rotational center than the urging center on a face side of the brake disk and lying on both sides of the first straight line, and wherein a pair of slide pin supporting points of the bracket are located in a region extending from the second straight line to a third straight line which passes the urging center in parallel to with the second straight line.

With the above construction, the distance between the slide pin supporting point and the fixed point is reduced and therefore, the rotational moment produced about the fixed point due to the braking torque becomes smaller. This provides an improvement in durability of the bracket.

It is a further object of the present invention to provide a disk brake of the type described above, which includes a hanger pin slip-out preventing structure capable of preventing not only the slip-out of the hanger pin but also the looseness or rickety motion of the hanger pin.

To achieve the above object, according to the present invention, there is provided a reaction force type disk brake, wherein the hanger pin is withdrawably inserted through pin holes in the clamping arms and has an annular groove in an outer peripheral surface at one end thereof which projects from an outer side of the brake caliper, and a slip-out preventing plate is disposed on the outer side of the brake caliper and is comprised of a locking piece extending in a direction perpendicular to the hanger pin and a fixing piece connected to the locking piece and extending in parallel with the hanger pin, the locking piece having a U-shaped locking groove for engagement with the annular groove in the hanger pin to inhibit the axial movement of the hanger pin, and a larger diameter hole connected to an opened end of the locking groove and permitting the insertion of the hanger pin therethrough, the fixing piece being secured to the brake caliper by a screw having a tip end urged against an outer peripheral surface of the hanger pin within one pin hole.

With the above construction, the slip-out of the hanger pin can be reliably prevented by cooperation of the annular groove of the hanger pin, the locking groove of the slip-out preventing plate and the screw. In addition, the hanger pin is urged against an inner surface of the pin hole by the screw and therefore, the axial and radial looseness or rickety motion of the hanger pin can be prevented. Further, the structure of the hanger pin is simple.

It is a yet further object of the present invention to provide a disk brake of the type described above, wherein a rigidity can be given to the bracket and each slide pin.

To achieve the above object, according to the present invention, there is provided a reaction force type disk brake, wherein the bracket has a frame-shaped body without a gap, and the two slide pins are mounted to extend between two opposed side portions of the body, respectively.

With the above construction, a rigidity is given to the slide pins by supporting opposite ends thereof. This ensures that even if the braking torque of the second friction pad is supported on the brake caliper, each slide pin exhibits a sufficient durability and hence, the brake caliper can slide smoothly at all times and it is possible to provide a reduction in diameter of each slide pin. Further, since the bracket is formed into a rigid frame structure, it has a sufficient rigidity even if the weight thereof is reduced. This makes it possible to provide a reduction in weight of the disk brake in cooperation with a reduction in diameter of the slide pin.

Further, it is a object of the present invention to provide a disk brake of the type described above, wherein the brake caliper can slide smoothly while the two friction pads are moved from an initial phase of wear to a limit of wear.

To achieve the above object, according to the present invention, there is provided a reaction force type disk brake, wherein each of the slide pins is disposed to extend from one face side to the other face side of the brake disk, and the brake caliper has ear portions located at its opposite ends, each of the ear portions being supported on corresponding one of the slide pins, a bisected point of the ear portion in a direction of the rotational axis of the brake disk being moved from one side to the other side of a thicknesswise bisected point of the brake disk while the friction pads reduce in thickness from an initial condition to a limit of wear.

With the above construction, each of the ear portions of the brake caliper lies outside the outer periphery of the brake disk at all times while the friction pads shift from the initial position to the position of limit of wear. Therefore, a twisting cannot be produced in the brake caliper during braking. In cooperation with an improvement in rigidity of the slide pin, this ensures that the brake caliper can slide smoothly.

Yet further, it is an object of the present invention to provide a disk brake of the type described above, wherein a lowering in strength of a connecting structure for the blocks forming the brake caliper is avoided, and the maintenance and inspection of the brake is easy.

To achieve the above object, according to the present invention, there is provided a reaction force type disk brake, wherein the first and second blocks are secured together by a plurality of connecting bolts, and the ear portions located on the second block are slidably carried on the slide pins.

With the above construction, any force caused due to the braking torque is not applied at all to each of the connecting bolts securing the first and second blocks and therefore, a lowering in strength of the connecting structure for the blocks can be avoided.

Moreover, the brake caliper is formed into a unit by the connecting bolts and therefore, the handling property thereof is good at the time of maintenance and inspection.

It is a further object of the present invention to provide a reaction force type disk brake, wherein the deflection caused at the braking-torque supporting portions is prevented from being transmitted to the slide pin supporting portions.

To achieve the above object, according to the present invention, there is provided a reaction force type disk brake, wherein the body of the bracket is provided with a portion for supporting the slide pin and a portion for supporting the braking torque of the first friction pad, these supporting portions being formed in a bifurcated manner from a portion in which the first points exist.

With the above construction, any deflection of the braking-torque supporting portion cannot be transmitted to the slide pin supporting portion, thereby preventing occurrence of a twisting between the slide pin and the slide pin supporting portion, so that the brake caliper can slide smoothly at all times.

The above and other objects, features and advantages of the invention will become apparent from a reading of the following description of a preferred embodiment, taken in conjunction with the accompanying drawings.

DESCRIPTION OF THE PREFERRED EMBODIMENT

Figure 1:
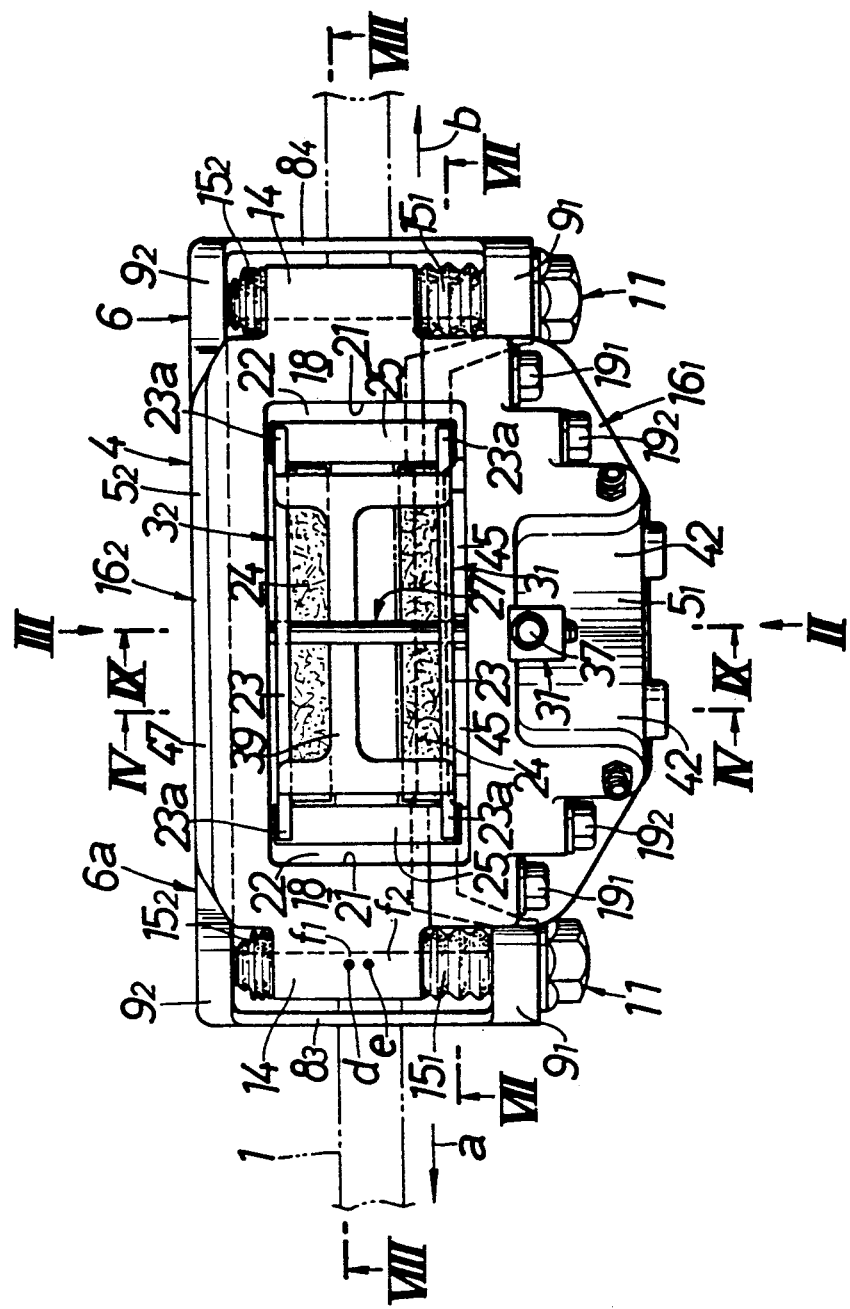
FIG. 1 is a plan view of a reaction force type disk brake.

The drawings illustrate a reaction force type disk brake D for a vehicle.

Referring to FIGS. 1 to 4, a brake disk 1 is rotatable with a wheel in a direction of an arrow a during advance of the vehicle and in a direction of an arrow b during reverse. A first friction pad $3_1$ and a second friction pad $3_2$ are disposed in an opposed relation to opposite faces of the disk brake 1 and are clamped between a first clamping arm $5_1$ and a second clamping arm $5_2$ of a brake caliper 4. Opposite ends of the brake caliper 4 located in a circumferential direction of the brake disk 1 are carried on a bracket 6 such that the caliper 4 is slidable outside the periphery of the brake disk 1 in the direction of a rotational axis c of the disk 1, and the bracket 6 is fixed to the vehicle through a knuckle 7, FIG. 2, which is a fixing member.

As shown in FIGS. 1 to 3 and 5, a body 6a of the bracket 6 is formed into a frame-like configuration without a gap and includes a first side portion $8_1$ and a second side portion $8_2$ opposed at their intermediate portions to the opposite faces of the brake disk 1, respectively, and a third side portion $8_3$ and a fourth side portion $8_4$ which connect opposite ends of the first and second side portions $8_1$ and $8_2$ to each other at positions radially outwardly of the brake disk 1.

The first side portion $8_1$ is provided at its intermediate portion with a pair of braking-torque bearing or supporting portions 40 in an opposed relation to each other, and at its opposite outermost ends with a pair of slide pin supporting portions $9_1$. Thus, the braking-torque bearing portions 40 and the slide pin supporting portions $9_1$ are formed in a bifurcated manner from a portion in which a fixing bolt insertion hole 46 exists. The second side portion $8_2$ is provided at its opposite outermost ends with a pair of slide pin supporting portions $9_2$ in a manner projecting therefrom and opposed to the slide pin supporting portions $9_1$.

Figure 6:
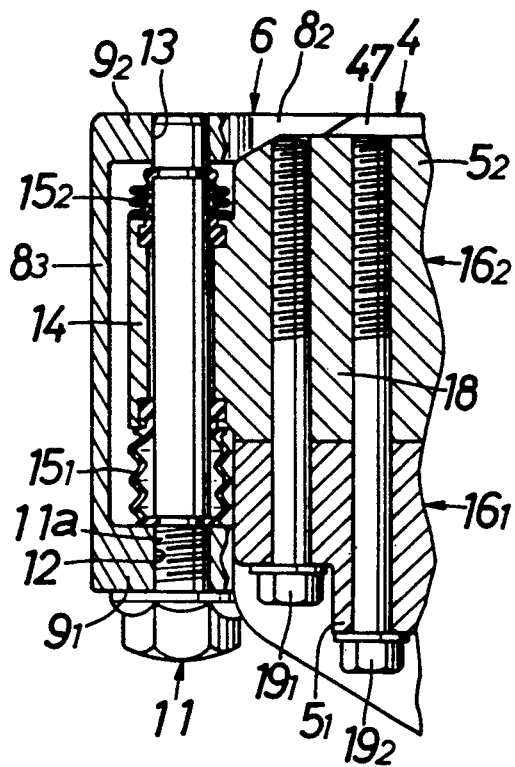
FIG. 6 is a sectional view taken along a line VI—VI in FIG. 2.

As clearly shown in FIGS. 1 and 6, slide pins 11 are mounted to extend between the two pairs of opposed slide pin supporting portions $9_1$ and $9_2$, respectively. Each of the slide pins 11 has, at its base end, an external or male threaded portion $11a$ which is screwed into an internal female threaded hole 12 defined in each slide pin supporting portion $9_1$ on the first side portion $8_1$. A tip end of each pin 11 is fitted into a pin hole 13 made in each slide pin supporting portion $9_2$ on the second side portion $8_2$. As a result of this arrangement, each pin 11 is disposed to extend from a face side to the other face side of the brake disk 1.

The brake caliper 4 has an ear portion 14 at each of its opposite ends in the circumferential direction of the brake disk 1. Each of the ear portions 14 is slidably fitted over the corresponding slide pin 11. Exposed portions of each slide pin 11 from the corresponding ear portion 14 are covered with expandable dust-proof boots $15_1$ and $15_2$.

Figure 7:
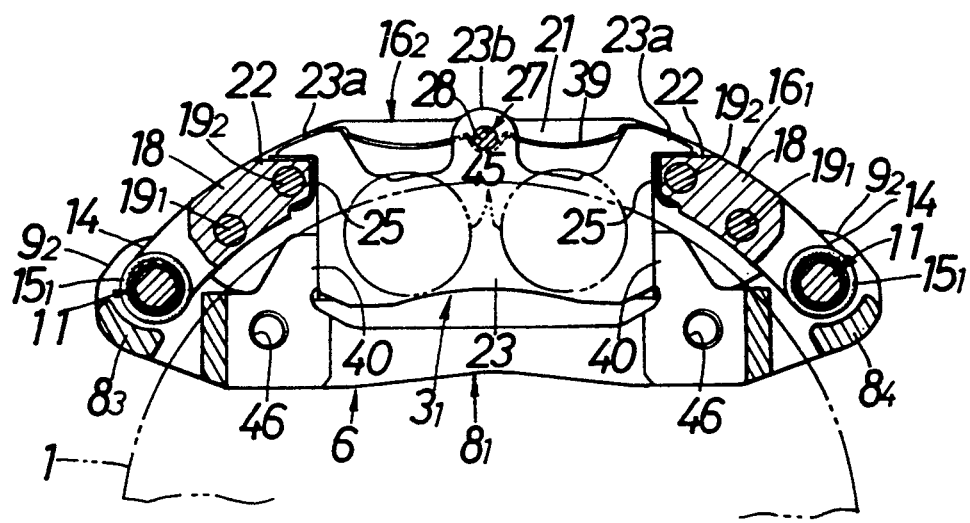
FIG. 7 is a sectional view taken along a line VII—VII in FIG. 1.
Figure 8:
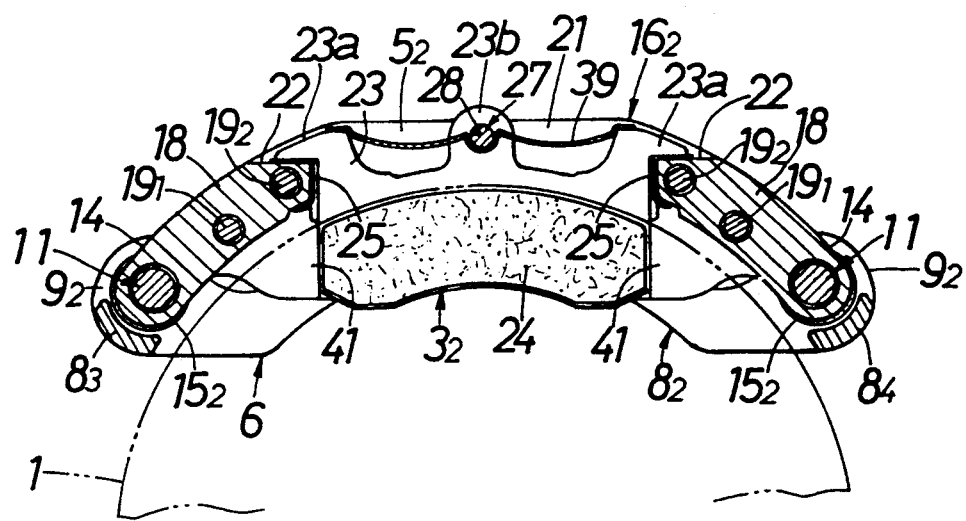
FIG. 8 is a sectional view taken along a line VIII—VIII in FIG. 1.

The caliper 4 is comprised of a first block $16_1$ having the first clamping arm $5_1$ and a second block $16_2$ having the second clamping arm $5_2$, so that a pair of bridges 18, FIGS. 7 and 8 for connecting the opposite ends of the clamping arms $5_1$ and $5_2$ located in the circumferential direction of the brake disk 1 are formed by mating a pair of opposed projections of the blocks $16_1$ and $16_2$. The blocks $16_1$ and $16_2$ are secured by two connecting bolts $19_1$ and $19_2$ at each bridge 18.

The ear portion 14 is provided at a bridge forming portion of the second block $16_2$, whereby the second block $16_2$ is slidably supported by the slide pins 11.

A window 21 is defined by the first and second clamping arms $5_1$ and $5_2$ and the bridge 18, 18, and a step 22 extending in the direction of the rotational axis c is formed at an inner side of each of opposite ends of the window 21 located in the circumferential direction of the brake disk 1.

Each of the friction pads $3_1$ and $3_2$ is comprised of a backing 23 and a lining 24 bonded to the backing 23, and as shown in FIGS. 7 and 8, a hook-shaped portion $23a$ at each of opposite ends of each backing 23 in the circumferential direction of the brake disk 1 is slidably hung on the step 22 through a retainer 25.

Figure 9:
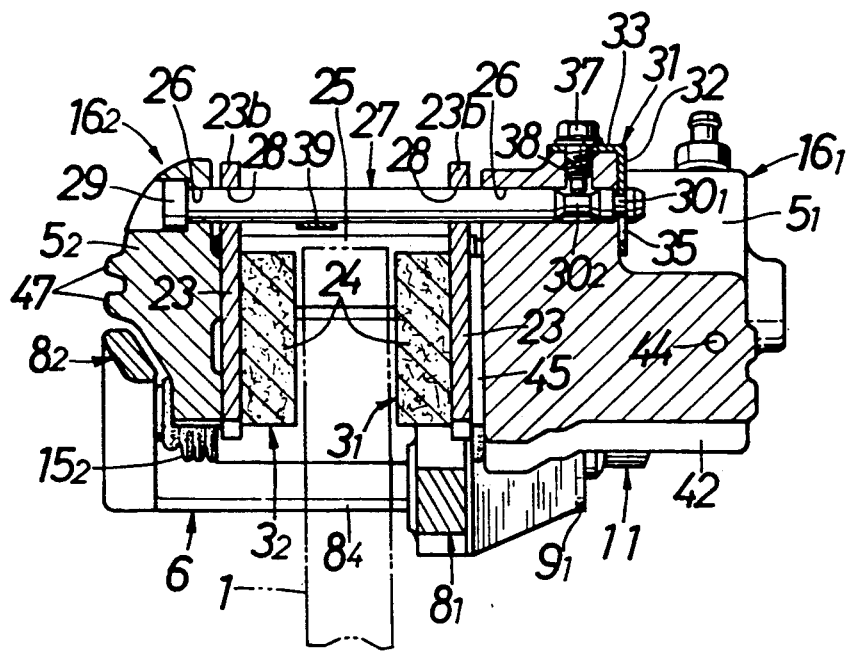
FIG. 9 is a sectional view taken along a line IX—IX in FIG. 1.

As shown in FIGS. 1 and 9, at a central portion of the window 21 in the circumferential direction of the brake disk 1, a pin hole 26 is provided in each of the clamping arms $5_1$ and $5_2$ to extend in the direction of the rotational axis c, and a hanger pin 27 is removably inserted in the pin holes 26.

At a circumferentially central portion, the backing 23 of each of the friction pads $3_1$ and $3_2$ is provided with a projection $23b$ having a through hole 28 made therein, and the hanger pin 27 is inserted through the through hole 28. This ensures that the friction pads $3_1$ and $3_2$ are hung by the hanger pin 27.

A slip-out preventing structure is provided between the brake caliper 4 and the hanger pin 27 and constructed in the following manner.

Figure 10:
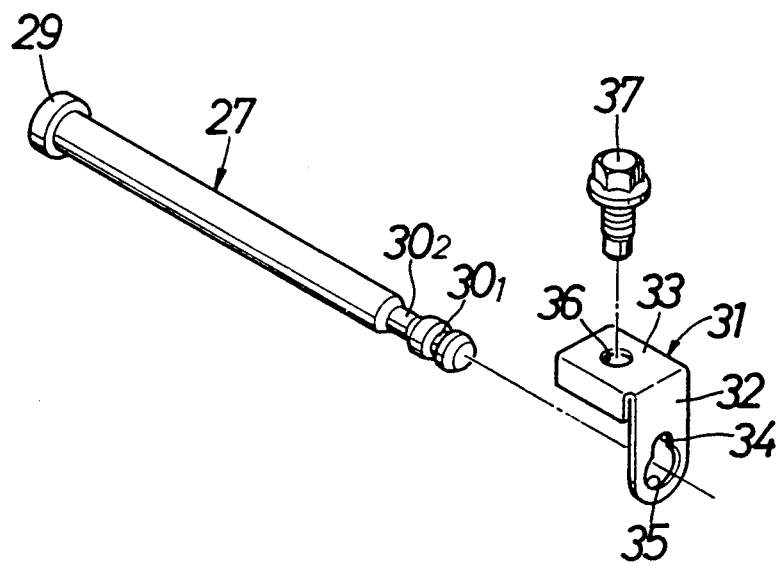
FIG. 10 is a perspective view illustrating a relationship between a hanger pin, a slip-out preventing plate and a screw.

As clearly shown in FIGS. 9 and 10, the hanger pin 27 is provided, at its base end closer to the second clamping arm $5_2$, with a stopper 29 which engages an opening edge of the pin hole 26 of the second arm $5_2$. The hanger pin 27 further has a first annular groove $30_1$ formed in an outer peripheral face of its tip end projecting from an outer surface of the first clamping arm $5_1$, and a second annular groove $30_2$ formed in a portion of its outer peripheral surface facing an inner peripheral surface of the pin hole 26 of the first arm $5_1$ in the vicinity of the first annular groove $30_1$.

A slip-out preventing plate 31 is disposed on the outer side of the first clamping arm $5_1$ and is comprised of a locking piece 32 extending in a direction perpendicular to the hanger pin 27, and a fixing piece 33 connected to the locking piece 32 and extending in parallel with the hanger pin 27. The locking piece 32 is perforated with a U-shaped locking groove 34 and a larger diameter hole 35 connected to an opened end of the groove 34. The larger diameter hole 35 permits the insertion of the hanger pin 27 therethrough, and the locking groove 34 engages the first annular groove $30_1$ in the hanger pin 27 to inhibit the axial movement of the hanger pin 27. The fixing piece 36 has a screw insertion hole 33 and is secured to the first clamping arm $5_1$ by bringing a screw 37 inserted in the screw insertion hole 36 in a direction perpendicular to the hanger pin 27 into threaded engagement with an internal or female threaded hole 38 formed in the first clamping arm $5_1$. The internal threaded hole 38 communicates with the pin hole 26, and a tip end of the screw 37 abuts against a bottom of the second annular groove $30_2$ of the hanger pin 27 thereby to urge the hanger pin against the inner surface of the pin hole 26.

As clearly shown in FIGS. 1, 7 and 8, a pad spring 39 is retained on the hanger pin 27, so that each of opposite ends of the pad spring 39 urges corresponding one of the hook-shaped portions $23a$ of the first and second friction pads $3_1$ and $3_2$ against the step 22 with a resilient force, thereby preventing any rickety motion or looseness of the friction pads $3_1$ and $3_2$.

As clearly shown in FIG. 7, the opposite sides of the backing 23 of the first friction pad $3_1$ in the circumferential direction of the brake disk 1 abut against the braking-torque supporting portions 40, respectively.

As shown in FIG. 8, braking-torque supporting portions 41 for the second friction pad $3_2$ are projectingly provided on corresponding base ends of those portions of the second block $16_2$ which define the bridge portions 18, 18, and the opposite ends of the backing 23 of the second friction pad $3_2$ in the circumferential direction of the brake disk 1 abut against the braking-torque supporting portions 41.

In the above construction, the exchange of the friction pads $3_1$ and $3_2$ by new ones may be conducted through the window 21.

Figure 2:
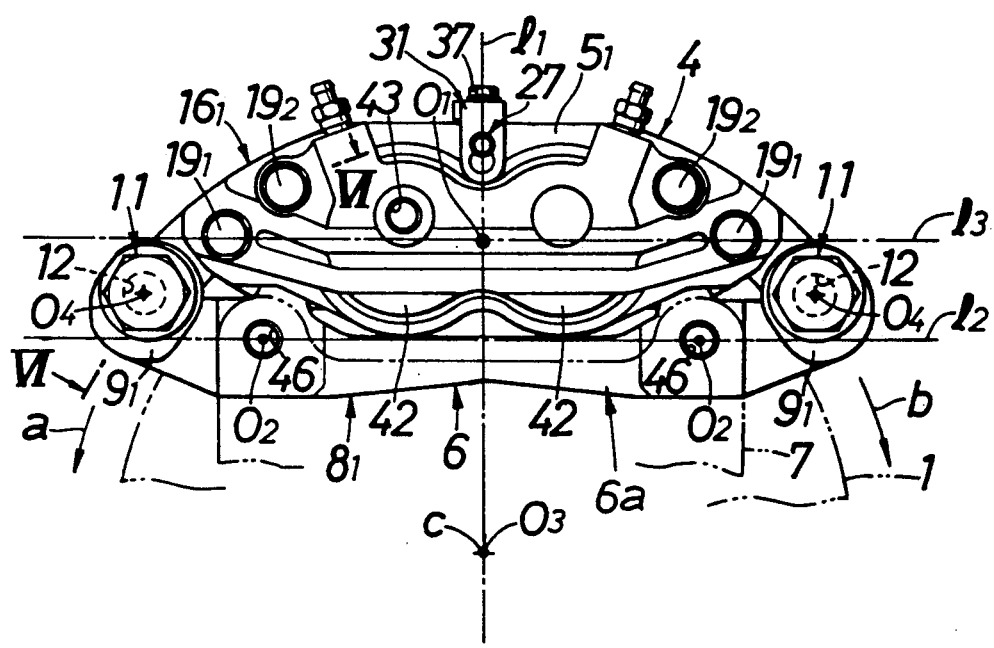
FIG. 2 is a view taken in the direction of an arrow II in FIG. 1.
Figure 4:
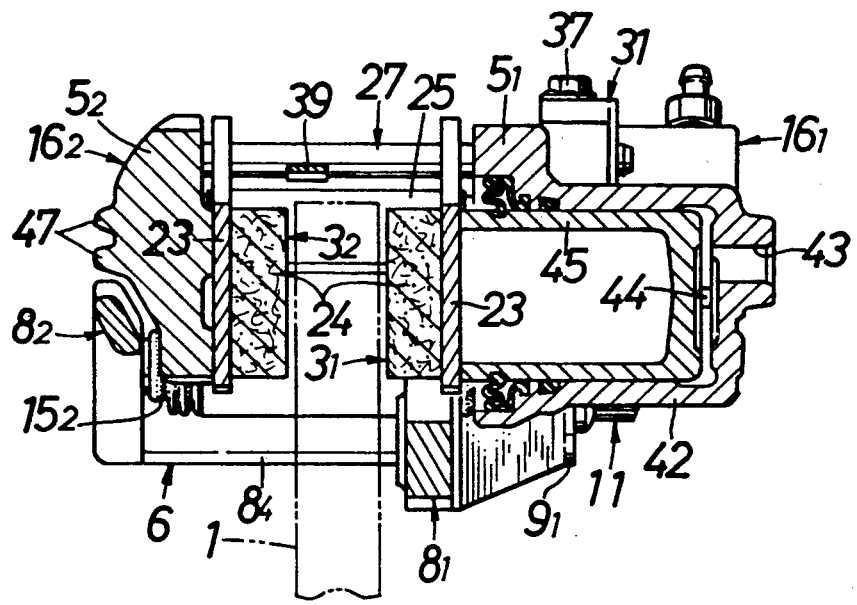
FIG. 4 is a sectional view taken along a line IV—IV in FIG. 1.
Figure 5:
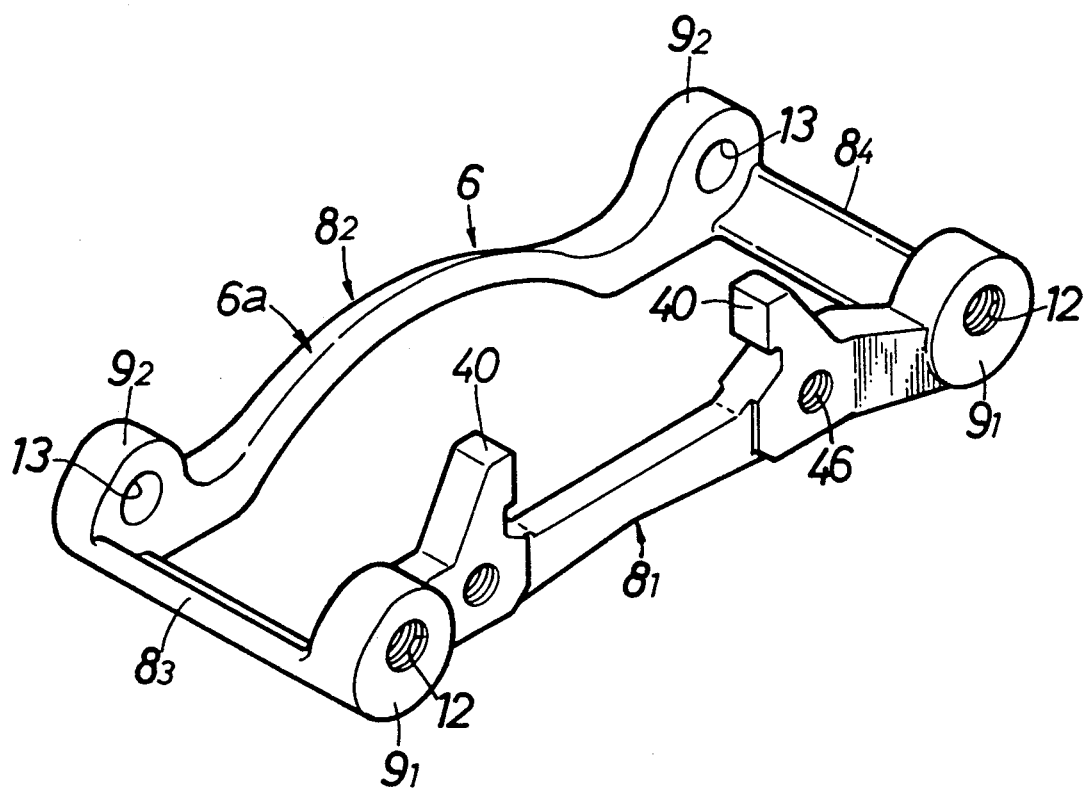
FIG. 5 is a perspective view of a bracket.

As clearly shown in FIGS. 2 and 4, a pair of cylinders 42 each having an opening directed to the first friction pad $3_1$ are formed at circumferentially spaced positions in the first clamping arm $5_1$ between the connecting bolts $19_2$ located inwardly of the adjacent bolts $19_1$ when viewed in FIG. 2. One of the cylinders 42 communicates with a known master cylinder through a pressurized oil intake hole 43, and both the cylinders 42 communicate with each other through a communication hole 44.

A piston 45 is slidably received in each of the cylinders 42 and serves as an urging member for urging the first friction pad $3_1$ against the brake disk 1. As shown in FIG. 2, the center $0_1$ of urging defined by the pistons 45 lies at a central point of the first friction pad $3_1$ seen in the circumferential direction of the brake disk 1, e.g., at a point at which a line connecting the axes of the pistons 45 is bisected in the illustrated embodiment.

Thus, the blocks $16_1$ and $16_2$ are secured together by at least a pair (two pairs in the illustrated embodiment) of connecting bolts $19_1$ and $19_2$ arranged on both sides of the pistons 45 in the circumferential direction of the brake disk 1, and the brake caliper 4 is mounted, for sliding movement in the direction of the rotational axis c of the brake disk 1, on the stationary bracket 6 through the pair of slide pins 11 arranged on the both sides of the pistons 45 in the circumferential direction of the brake disk. Moreover, each of the connecting bolts $19_1$ and $19_2$ is disposed in proximity to the piston 45, while each of the slide pins 11 is disposed at a larger distance from the piston 45 than from each of the connecting bolt $19_1$ and $19_2$.

As clearly shown in FIG. 2, a pair of fixed points of the bracket 6 onto the knuckle 7 (the centers $0_2$ of fixing bolt insertion holes 46 in the illustrated embodiment) are established on one side of the brake disk 1 on a second straight line $1_2$ which intersects (at right angles in the illustrated embodiment) a first straight line $1_1$ passing the urging center $0_1$ and the rotational center $0_3$ of the brake disk, at a location closer to the rotational center $0_3$ than the urging center $0_1$. The centers $0_2$ lie on the both sides of the first straight line $1_1$.

A pair of slide pin supporting points on the bracket 6 (the centers $0_4$ of the female threaded holes 12 and of the pin holes 13 in the illustrated embodiment) are disposed, as seen in FIG. 2, in a region extending from the second straight line $1_2$ to a third straight line $1_3$ which passes the urging center $0_1$ in parallel with the second straight line $1_2$.

The positional relationship of each ear portion 14 of the brake caliper 4 with respect to the corresponding slide pin 11 is established in the following manner:

As clearly shown in FIG. 1, each ear portion 14 is supported by the corresponding slide pin 11 in such a fashion that a point d of bisection of each ear portions 14 in the direction of the rotational axis c of the brake disk 1 shifts from one side $f_1$ toward the other side $f_2$ of a thicknesswise bisected point e of the brake disk 1, while the friction pads $3_1$ and $3_2$ reduces in thickness from an initial condition to a limit of wear.

Figure 3:
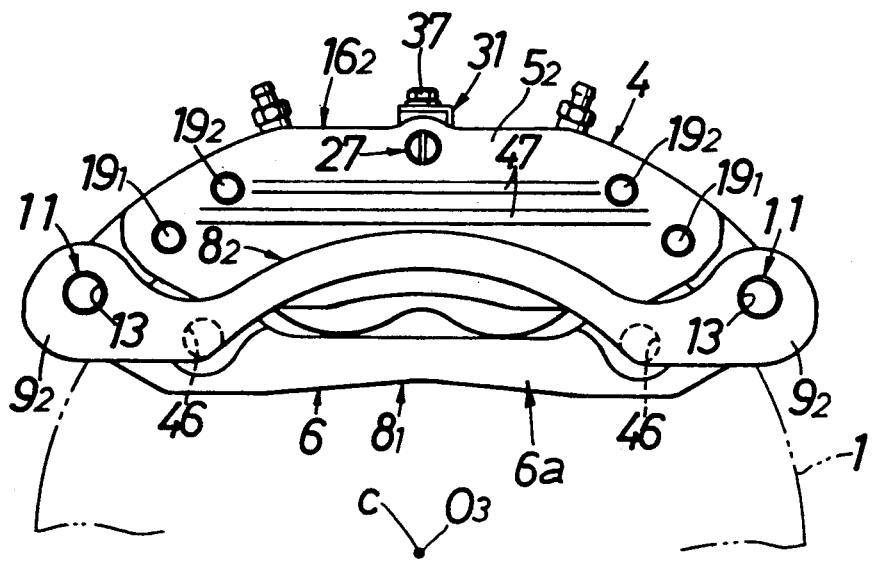
FIG. 3 is a view taken in the direction of an arrow III in FIG. 1.

As clearly shown in FIG. 3, a pair of straight reinforcing ribs 47 are formed in parallel to each other on an outer side of the second clamping arm $5_2$ so as to extend over portions near opposite ends in the circumferential direction of the brake disk.

The operation of this embodiment will be described below.

If the pressurized oil is supplied from the master cylinder (not shown) through the pressurized oil intake hole 43 to the cylinders 42 by the operation of a brake pedal or the like when the vehicle is travelling forwardly, the pistons 45 advanced by the action of such pressurized oil urge the first friction pad $3_1$, and hence, the first friction pad $3_1$ slide on the step 22 of the brake caliper 4 and on the hanger pin 27 and is urged against one face of the brake disk 1. A reaction produced by such urging force causes the brake caliper 4 to slide on the slide pins 11 in a direction opposite to the pistons 45, thereby allowing the second friction pad $3_2$ to be urged against the other face of the brake disk 1 via the second clamping arm $5_2$. This results in application of a braking force to the brake disk 1.

During this braking operation, the braking torque of the first friction pad $3_1$ is supported by the braking-torque supporting portions 40 of the bracket 6, while the braking torque of the second friction pad $3_2$ is supported by the brake caliper 4 and thus by the braking-torque supporting portions 41 of the second block $16_2$.

In this case, when the braking torque of the first friction pad $3_1$ is supported by the braking-torque supporting portion 40, the latter produces somewhat deflection, but such deflection cannot be transmitted to the slide pin supporting portion $9_1$, because the braking-torque supporting portion 40 and the slide pin supporting portion $9_1$ are independent from each other. This ensures that a twisting is prevented from being produced between the slide pin 11 and the slide pin supporting portion $9_1$ due to the braking torque. In addition, each slide pin 11 is hung on the bracket 6 which has a frame shaped body without a gap and hence, a rigidity is provided to the slide pin 11 by supporting its opposite ends. This ensures that even if the braking torque of the second friction pad $3_2$ is supported by the second block $16_2$, a bending cannot be produced in the slide pins 11 and moreover, a reduction in diameter of the slide pins 11 is possible. Further, the bracket 6 is formed into a rigid frame structure and therefore, has a sufficient rigidity even if the weight thereof is reduced. This enables a reduction in weight of the disk brake D in cooperation with a reduction in diameter of each slide pin 11.

Further, a force due to the braking torque is not applied at all to the individual connecting bolts $19_1$ and $19_2$ which securing the first and second blocks $16_1$ and $16_2$ together and hence, a lowering in strength of the structure for connecting the blocks $16_1$ and $16_2$ can be avoided.

Moreover, the brake caliper 4 is formed into a unit by the connecting bolts $19_1$ and $19_2$ and hence, in the maintenance and inspection of the brake, it can be handled satisfactorily.

Each ear portion 14 of the brake caliper 4 is located outside the outer periphery of the brake disk 1 at all times, while the friction pads $3_1$ and $3_2$ are moved from the initial phase of wear to the limit of wear. Therefore, a twisting cannot be produced in the brake caliper 4 during braking, and a smooth sliding movement of the brake caliper can be achieved in cooperation of an improvement in rigidity of the slide pin 11.

In addition, by specially determining the positional relationship between the slide pin supporting point $0_4$ and the fixed point $0_2$ in the bracket 6 in the above manner, the distance therebetween is reduced. Therefore, a rotational moment produced about the fixed point $0_2$ due to the braking torque becomes smaller, thereby ensuring that the durability of the bracket 6 can be increased.

Further, since the connecting bolts $19_1$ and $19_2$ are disposed in proximity to the pistons 45, as described above, the strength of connection between the blocks $16_1$ and $16_2$ in the brake caliper 4 is increased. This ensures that the clamping arms $5_1$ and $5_2$ can be prevented from opening or spreading during operation of the piston 45.

On the other hand, since the slide pins 11 are spaced from the pistons 45, the distance between the slide pins 11 is increased, ensuring that the brake caliper 4 can be supported on the bracket 6 with a good stability.

Moreover, the slip-out of the hanger pin 27 can be reliably prevented by cooperation of the first annular groove $30_1$ in the pin 27, the locking groove 34 in the slip-out preventing plate 31 and the screw 37.

Additionally, the hanger pin 27 can be urged against the inner surface of the pin hole 26 by the screw 37 and hence, the axial and radial rickety motion or looseness of the hanger pin 27 can be prevented.

Figure 11:
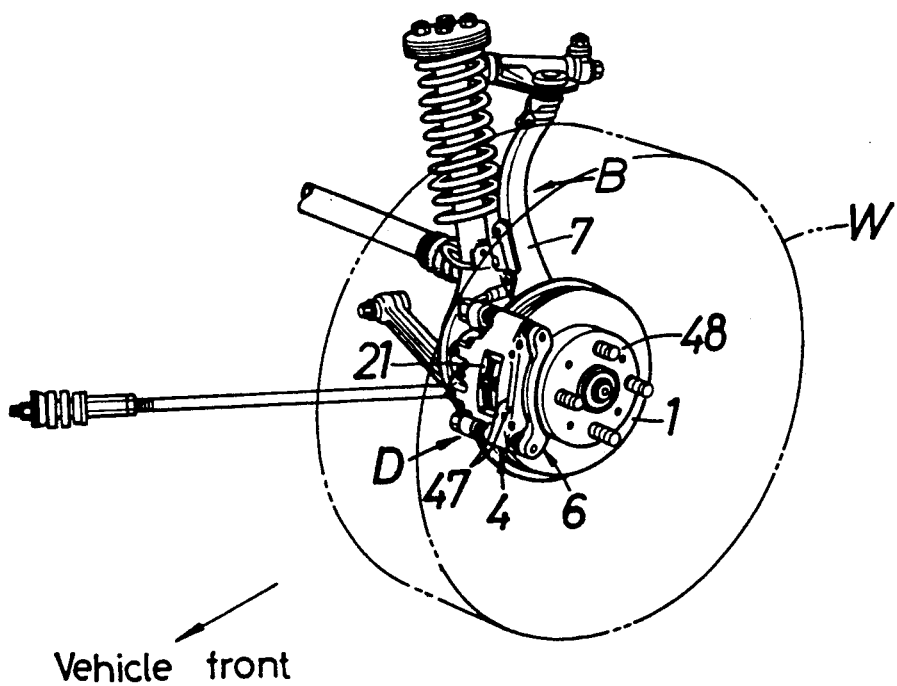
FIG. 11 is a perspective view illustrating a relationship between a vehicle body and the disk brake.

FIG. 11 illustrates a relationship between the disk brake D and the vehicle body B. The brake caliper 4 is disposed with its window 21 being directed forwardly of the vehicle and with the second clamping arm $5_2$ being located on the side of the wheel W, and the bracket 6 is fixed to the knuckle 7. The brake disk 1 is secured to a hub 48 to which the wheel W is mounted.

If the brake caliper 4 is disposed in this manner, travelling wind is introduced inside the brake caliper 4 through the window 21, and the reinforcing ribs 47 also function as cooling fins, thereby enabling the friction pads $3_1$ and $3_2$ and the brake caliper 4 to be cooled efficiently.

What is claimed is:

1. A reaction force type disk brake comprising a brake disk, a first and a second friction pad which are opposed to opposite faces of said brake disk, a brake caliper including a first and a second clamping arm for clamping said friction pads, a gapless frame-shaped stationary bracket for supporting opposite ends of said brake caliper in a circumferential direction of the brake disk through respective slide pins outside an outer periphery of said brake disk so as to permit the brake caliper to slide in a direction of a rotational axis of said brake disk, an urging member mounted on said first clamping arm for urging said first friction pad against said brake disk, an urging center of the urging member being at a central location of said first friction pad in the circumferential direction of the brake disk, a braking-torque supporting portion provided on said bracket for supporting a braking torque of said first friction pad, and a braking-torque supporting portion provided on said brake caliper for supporting a braking torque of said second friction pad, the urging center and a rotational center of the brake disk being set on a first straight line, said bracket being fixed to a fixing member at a pair of fixed points on both sides of the first straight line, the fixed points being located on a second straight line intersecting a first straight line at a location closer to the rotational center than the urging center on a face side of said brake disk, wherein a pair of slide pin supporting points of said bracket are located in a region extending from said second straight line to a third straight line which passes said urging center in parallel with said second straight line.

2. A reaction force type disk brake comprising a brake disk, a pair of friction pads which are opposed to opposite faces of said brake disk, a brake caliper including a first and a second clamping arm for clamping said friction pads, and a hanger pin mounted to extend between said clamping arms for hanging said friction pads, wherein said hanger pin is withdrawably inserted through pin holes in said clamping arms and has an annular groove around an outer periphery of one end thereof which projects from an outer side of said brake caliper, and a slip-out preventing plate is disposed on the outer side of said brake caliper and is comprised of a blocking piece extending in a direction perpendicular to said hanger pin and a fixing piece connected to said locking piece and extending in parallel with said hanger pin, said locking piece having a U-shaped locking groove for engagement with said annular groove in said hanger pin to inhibit an axial movement of said hanger pin, and a larger diameter hole connected to an opened end of said locking groove and permitting insertion of said hanger pin therethrough, said fixing piece being secured to said brake caliper by a screw which has a tip end urging said hanger pin against an inner surface of said pin hole.

3. A reaction force type disk brake comprising a brake disk, a first and a second friction pad which are opposed to opposite faces of said brake disk, a brake caliper including a first and a second clamping arm for clamping said friction pads, a stationary bracket for supporting opposite ends of said brake caliper in a circumferential direction of the brake disk through slide pins outside an outer periphery of said brake disk so as to permit the brake caliper to slide in a direction of a rotational axis of said brake disk, an urging member mounted on said first clamping arm for urging said first friction pad against said brake disk, a braking-torque supporting portion provided on said bracket for supporting a braking torque of said first friction pad, and a braking-torque supporting portion provided on said brake caliper for supporting a braking torque of said second friction pad, wherein said bracket has a continuous frame-shaped body, including first and second side portions opposed at their intermediate portions to the opposite sides of said brake disk and third and fourth side portions which connect opposite ends of said first and second side portions to each other at portions outwardly of said brake disk, and said slide pins are mounted to extend between two opposed side portions of said body, respectively.

4. A reaction force type disk brake according to claim 3, wherein each of said slide pins is disposed to extend from one face side to the other face side of said brake disk, and said brake caliper has ear portions located at opposite ends thereof, each of said ear portions being supported on corresponding one of said slide pins so that a bisected point of said ear portion in a direction of the rotational axis of said brake disk shifts over a thicknesswise bisected point of said brake disk from one side to the other side while the friction pads reduce in thickness from an initial condition to a limit of wear.

5. A reaction force type disk brake comprising a brake disk, a first and a second friction pad which are opposed to opposite faces of said brake disk, a brake caliper including a first and a second clamping arm for clamping said friction pads, a stationary bracket for supporting opposite ends of said brake caliper in a circumferential direction of the brake disk through a pair of slide pins outside an outer periphery of said brake disk so as to permit the brake caliper to slide in a direction of a rotational axis of said brake disk, an urging member provided in said first clamping arm to urge said first friction pad against said brake disk, and a braking-torque supporting portion provided on said bracket for supporting a braking torque of said first friction pad, said brake caliper being comprised of a first block having said first clamping arm and a second block having said second clamping arm and a braking torque supporting portion for supporting the braking torque of said second friction pad, wherein said bracket has a frame-shaped body without a gap and said slide pins are mounted to extend between two opposed side portions of said body, respectively, and wherein said first and second blocks are secured together by a plurality of connecting bolts, said second block being slidably carried on said slide pins.

6. A reaction force type disk brake comprising a brake disk, a first and a second friction pad which are opposed to opposite faces of said brake disk, a brake caliper including a first and a second clamping arm for clamping said friction pads, a bracket fixed to a fixing member by a pair of bolts for supporting said brake caliper through a pair of slide pins outside an outer periphery of said brake disk so as to permit said brake caliper to slide in a direction of a rotational axis of said brake disk, an urging member provided in said first clamping arm to urge said first friction pad against said brake disk, wherein said bracket has a body which is provided, including first and second side portions opposed at their intermediate portions to the opposite sides of said brake disk and third and fourth side portions which rigidly connect opposite ends of said first and second side portion to each other at portions outwardly of said brake disk, with a slide pin supporting portion for supporting said slide pins and a braking-torque supporting portion for supporting a braking torque of said first friction pad, said slide pin supporting portion and braking-torque supporting portion being formed in a bifurcated manner from a portion in which bolts are applied.

7. A reaction force type disk brake comprising:
a brake disk;
a first and a second friction pad which are opposed to opposite faces of said brake disk;
a brake caliper including a first and a second clamping arm for clamping said friction pads;
an urging member provided in said first clamping arm to urge said first friction pad against said brake disk;
said urging member having its urging center at a central location of said first friction pad in the circumferential direction of the brake disk;
a gapless frame-shaped bracket fixed to a fixing member and supporting said brake caliper through a pair of slide pins which are aranged on both sides of said urging member in a circumferential direction of the brake disk so as to permit the caliper to slide in a direction of a rotational axis of said brake disk;
said brake caliper being comprised of a first block having said first clamping arm, and a second block having said second clamping arm and secured to said first block by at least a pair of connecting bolts arranged on both sides of said urging member in the circumferential direction of the brake disk;
each of said connecting bolts is disposed in more proximity to said urging member than the slide pins;
said urging center and a rotational center of the brake disk set on a first straight line;
said bracket being fixed to the fixing member at a pair of fixed points on both sides of the first straight line;
said fixed points being located on a second straight line intersecting a first straight line at a location closer to the rotational center than the urging center on a face side of the brake disk;
a pair of slide pin supporting points of the bracket being located in a region extending from second straight line to a third straight line which passes said urging center in parallel with said second straight line.

8. A reaction force type disk rake according to claim 7, further including a hanger pin mounted to extend between the clamping arms for hanging the friction pads, wherein said hanger pin is withdrawably inserted through pin holes in the clamping arms and has an annular groove in an outer peripheral surface at one end thereof which projects from an outer side of said brake caliper, and a slip-out preventing plate is disposed on the outer side of said brake caliper and is comprised of a locking piece extending in a direction perpendicular to said hanger pin and a fixing piece connected to the locking piece and extending in parallel with said hanger pin, said locking piece having a U-shaped locking groove for engagement with said annular groove in said hanger pin to inhibit an axial movement of said hanger pin, and a larger diameter hole connected to an opened end of said locking groove and permitting insertion of said hanger pin therethrough, said fixing piece being secured to said brake caliper by a screw which has a tip end urging said hanger pin against an inner surface of said one pin hole.

9. A reaction force type disk brake according to claim 7, wherein body said two slide pins are mounted between two opposed side portions of said body respectively.

10. A reaction force type disk brake according to claim 9, wherein each of said slide pins is disposed to extend from one face side to the other face side of said brake disk, and said brake caliper has ear portions located at opposite ends thereof, each of said ear portions being supported on corresponding one of said slide pins so that a bisected point of said ear portion in a direction of the rotational axis of said brake disk shifts over a thicknesswise bisected point of said brake disk from one side to the other side as the friction pads reduce in thickness from an initial condition to limit of wear.

11. A reaction force type disk brake according to claim 10, wherein said first and second blocks are secured together by a plurality of connecting bolts, and said ear portions are located on said second block and are slidably carried on the slide pins.

12. A reaction force type disk brake according to claim 7, 9, 10 or 11, wherein the body of said bracket is provided with a portion for supporting said slide pins, and a braking-torque supporting portion for supporting a braking torque of said first friction pad, these slide pin supporting portion and braking-torque supporting portion being formed in a bifurcated manner from a portion in which the fixed point exists.

* * * * *